United States Patent
Iacovone et al.

(10) Patent No.: US 10,625,643 B2
(45) Date of Patent: Apr. 21, 2020

(54) CONDITIONING SYSTEM WITH BLOWER ATTACHMENT SYSTEM AND METHOD OF ATTACHMENT

(71) Applicant: GENTHERM GMBH, Odelzhausen (DE)

(72) Inventors: Peter Daniel Iacovone, Amherstburg (CA); Cristian Nicolae Banu, LaSalle (CA)

(73) Assignee: GENTHERM GMBH, Odelzhausen (DE)

( * ) Notice: Subject to any disclaimer, the term of this patent is extended or adjusted under 35 U.S.C. 154(b) by 62 days.

(21) Appl. No.: 15/898,970

(22) Filed: Feb. 19, 2018

(65) Prior Publication Data

US 2018/0361893 A1   Dec. 20, 2018

Related U.S. Application Data

(60) Provisional application No. 62/519,752, filed on Jun. 14, 2017.

(51) Int. Cl.
| | |
|---|---|
| *A47C 7/72* | (2006.01) |
| *B60N 2/56* | (2006.01) |
| *B60N 2/58* | (2006.01) |
| *B60N 2/70* | (2006.01) |
| *B60N 2/68* | (2006.01) |
| *B60N 2/50* | (2006.01) |

(52) U.S. Cl.
CPC ............. *B60N 2/5657* (2013.01); *B60N 2/50* (2013.01); *B60N 2/5628* (2013.01); *B60N 2/5635* (2013.01); *B60N 2/5642* (2013.01); *B60N 2/5685* (2013.01); *B60N 2/5825* (2013.01); *B60N 2/5875* (2013.01); *B60N 2/5883* (2013.01); *B60N 2/682* (2013.01); *B60N 2/70* (2013.01); *B60N 2/68* (2013.01)

(58) Field of Classification Search
CPC .......... B60N 2/5657; B60N 2/56; A47C 7/74; A47C 7/744; A47C 21/044; B60H 1/00285; B60H 2001/003; F04D 25/084; F04D 29/626
See application file for complete search history.

(56) References Cited

U.S. PATENT DOCUMENTS

| | | | |
|---|---|---|---|
| 2,931,286 | A | 4/1960 | Fry, Sr. et al. |
| 4,259,896 | A | 4/1981 | Hayashi et al. |
| | | (Continued) | |

FOREIGN PATENT DOCUMENTS

| | | |
|---|---|---|
| DE | 1995497 U | 10/1968 |
| EP | 1075984 B1 | 5/2003 |
| | (Continued) | |

OTHER PUBLICATIONS

Potentially Related Application, U.S. Appl. No. 15/898,974, filed Feb. 19, 2018.

(Continued)

*Primary Examiner* — Shin H Kim
(74) *Attorney, Agent, or Firm* — The Dobrusin Law Firm, P.C.

(57) ABSTRACT

A blower comprising: (a) a housing including: (i) one or more eyelets, and (ii) an inlet (b) one or more clips, wherein the one or more eyelets, one or more clips, or both assist in connecting the blower to a cushion of a seat, a ventilated trim bag, or both.

20 Claims, 5 Drawing Sheets

(56) References Cited

U.S. PATENT DOCUMENTS

| | | | |
|---|---|---|---|
| 4,923,248 | A | 5/1990 | Feher |
| 5,626,021 | A | 5/1997 | Karunasiri et al. |
| 6,003,950 | A | 12/1999 | Larsson |
| 6,048,024 | A | 4/2000 | Wallman |
| 6,064,037 | A | 5/2000 | Weiss et al. |
| 6,164,719 | A | 12/2000 | Rauh |
| 6,439,658 | B1 | 8/2002 | Ganz et al. |
| 6,464,468 | B2 * | 10/2002 | Colburn ............... F04D 25/084 417/234 |
| RE38,128 | E | 6/2003 | Gallup et al. |
| 6,619,736 | B2 | 9/2003 | Stöwe et al. |
| 6,626,488 | B2 | 9/2003 | Pfahler |
| 6,629,724 | B2 | 10/2003 | Ekern et al. |
| 6,676,207 | B2 | 1/2004 | Rauh et al. |
| 6,719,534 | B2 | 4/2004 | Aoki et al. |
| 6,761,399 | B2 | 7/2004 | Bargheer et al. |
| 6,840,576 | B2 | 1/2005 | Ekern et al. |
| 6,857,697 | B2 | 2/2005 | Brennan et al. |
| 6,869,139 | B2 | 3/2005 | Brennan et al. |
| 6,869,140 | B2 | 3/2005 | White et al. |
| 6,976,734 | B2 | 12/2005 | Stoewe |
| 7,040,710 | B2 | 5/2006 | White et al. |
| 7,083,227 | B2 | 8/2006 | Brennan et al. |
| 7,100,978 | B2 | 9/2006 | Ekern et al. |
| 7,213,876 | B2 | 5/2007 | Stoewe |
| 7,290,759 | B1 | 11/2007 | Lavrencik |
| 7,338,117 | B2 | 3/2008 | Iqbal et al. |
| 7,356,912 | B2 | 4/2008 | Iqbal et al. |
| 7,413,248 | B2 * | 8/2008 | Matsuhashi ............ B60N 2/70 297/217.3 |
| 7,452,028 | B2 | 11/2008 | Knoll et al. |
| 7,475,938 | B2 | 1/2009 | Stoewe et al. |
| 7,478,869 | B2 | 1/2009 | Lazanja et al. |
| 7,506,938 | B2 | 3/2009 | Brennan et al. |
| 7,510,239 | B2 | 3/2009 | Stöwe |
| 7,587,901 | B2 | 9/2009 | Petrovski |
| 7,618,089 | B2 | 11/2009 | Stoewe et al. |
| 7,637,569 | B2 | 12/2009 | Krobok et al. |
| 7,735,932 | B2 | 6/2010 | Lazanja et al. |
| 7,862,113 | B2 * | 1/2011 | Knoll ................. B60N 2/5635 297/180.14 |
| 7,905,545 | B2 * | 3/2011 | Andersson ........... B60N 2/0232 297/180.1 |
| 8,998,311 | B2 * | 4/2015 | Axakov ............... B60N 2/5635 297/180.13 |
| 9,173,500 | B2 * | 11/2015 | Squires ................. A47C 7/744 |
| 9,926,935 | B2 * | 3/2018 | Inda ................... F04D 25/0613 |
| 2004/0198212 | A1 | 10/2004 | Aoki et al. |
| 2005/0093347 | A1 | 5/2005 | Bajic et al. |
| 2006/0138812 | A1 | 6/2006 | Aoki |
| 2006/0290176 | A1 * | 12/2006 | Aoki .................... B60N 2/5628 297/180.1 |
| 2009/0218855 | A1 | 9/2009 | Wolas |
| 2013/0020841 | A1 | 1/2013 | Oota |
| 2013/0102699 | A1 | 4/2013 | Chatterjee et al. |
| 2013/0300179 | A1 * | 11/2013 | Ota ..................... B60N 2/5664 297/452.42 |
| 2013/0328359 | A1 * | 12/2013 | Antonov .............. A47C 7/742 297/180.14 |
| 2016/0356279 | A1 * | 12/2016 | Xu ...................... F04D 25/084 |
| 2018/0319298 | A1 * | 11/2018 | Sikorski .............. B60N 2/5621 |
| 2018/0361893 | A1 * | 12/2018 | Iacovone .............. B60N 2/50 |

FOREIGN PATENT DOCUMENTS

| | | |
|---|---|---|
| EP | 1323573 A2 | 7/2003 |
| FR | 2630056 A1 | 10/1989 |
| JP | 2003-165325 A | 6/2003 |
| JP | 2005-029085 A | 2/2005 |
| JP | 2006-176059 A | 7/2006 |
| JP | 2013-023003 A | 2/2013 |
| JP | 2013-124000 A | 6/2013 |
| KR | 10-1488179 B1 | 1/2015 |
| SE | 0102983 C2 | 3/2003 |

OTHER PUBLICATIONS

Japanese Office Action, for Japanese Application No. 2018-100980, dated May 10, 2019.

Korean Notice of Allowance, Application No. 10-2018-0067988, dated Dec. 17, 2019.

* cited by examiner

CONDITIONING SYSTEM WITH BLOWER ATTACHMENT SYSTEM AND METHOD OF ATTACHMENT

FIELD

The present teachings relate generally an insert that provides climate control, and more specifically an attachment system for attaching an insert, blower, or both to a vehicle seat so that the vehicle seat is conditioned.

BACKGROUND

For many years, industry has been concerned with designing improved conditioning systems for articles of manufacture such as seats, steering wheels, automotive vehicles, or other transportation vehicles. Examples of such conditioning systems are disclosed in U.S. Pat. Nos. 6,626,488; 6,869,140; 7,452,028; and 7,478,869; all of which are expressly incorporated herein by reference for all purposes. Many systems include a conditioner that is located on a top of a seat with a blower that is located on a bottom of the seat such that air is moved from a remote location to the insert to distribute the air. Some systems include an extended tail that extends from a location on top of the seat to a location behind or under the seat where a blower is located. These systems include a blower that is connected to the seat frame and the tail connects the inset to the blower.

What is needed is a blower that is connected proximate to the insert so that air is moved only a short distance before the air is distributed. What is needed is a blower that is free of attachment to the frame. It would be desirable to have a blower that hangs from a cushion so that the cushion dampens vibrations and noise produced by the blower. What is needed is a radial blower that is connected directly to a ventilated trim bag, cushion, or both. It would be desirable to have a radial blower that is free of direct attachment with a frame of a vehicle seat or a floor under the vehicle seat.

SUMMARY

The present teachings include: a blower comprising: (a) a housing including: (i) one or more eyelets, and (ii) an inlet (b) one or more clips, wherein the one or more eyelets, one or more clips, or both assist in connecting the blower to a cushion of a seat, a ventilated trim bag, or both.

The present teachings include: a conditioning system including one or more a blower comprising: (a) a housing including: (i) one or more eyelets, and (ii) an inlet (b) one or more clips, wherein the one or more eyelets, one or more clips, or both assist in connecting the blower to a cushion of a seat.

The present teachings include: a method comprising: (a) extending a blower over a ventilated trim bag; (b) placing an inlet or outlet of the blower in fluid communication with an attachment ring of the ventilated trim bag; (c) attaching one or more clips of the blower to a support of a cushion.

The present teachings provide a blower that is connected proximate to the insert so that air is moved only a short distance before the air is distributed. The present teachings provide a blower that is free of attachment to the frame. The present teachings provide a blower that hangs from a cushion so that the cushion dampens vibrations and noise produced by the blower. The present teachings provide a radial blower that is connected directly to a ventilated trim bag, cushion, or both. The present teachings provide a radial blower that is free of direct attachment with a frame of a vehicle seat or a floor under the vehicle seat.

DETAILED DESCRIPTION

Figure 1:
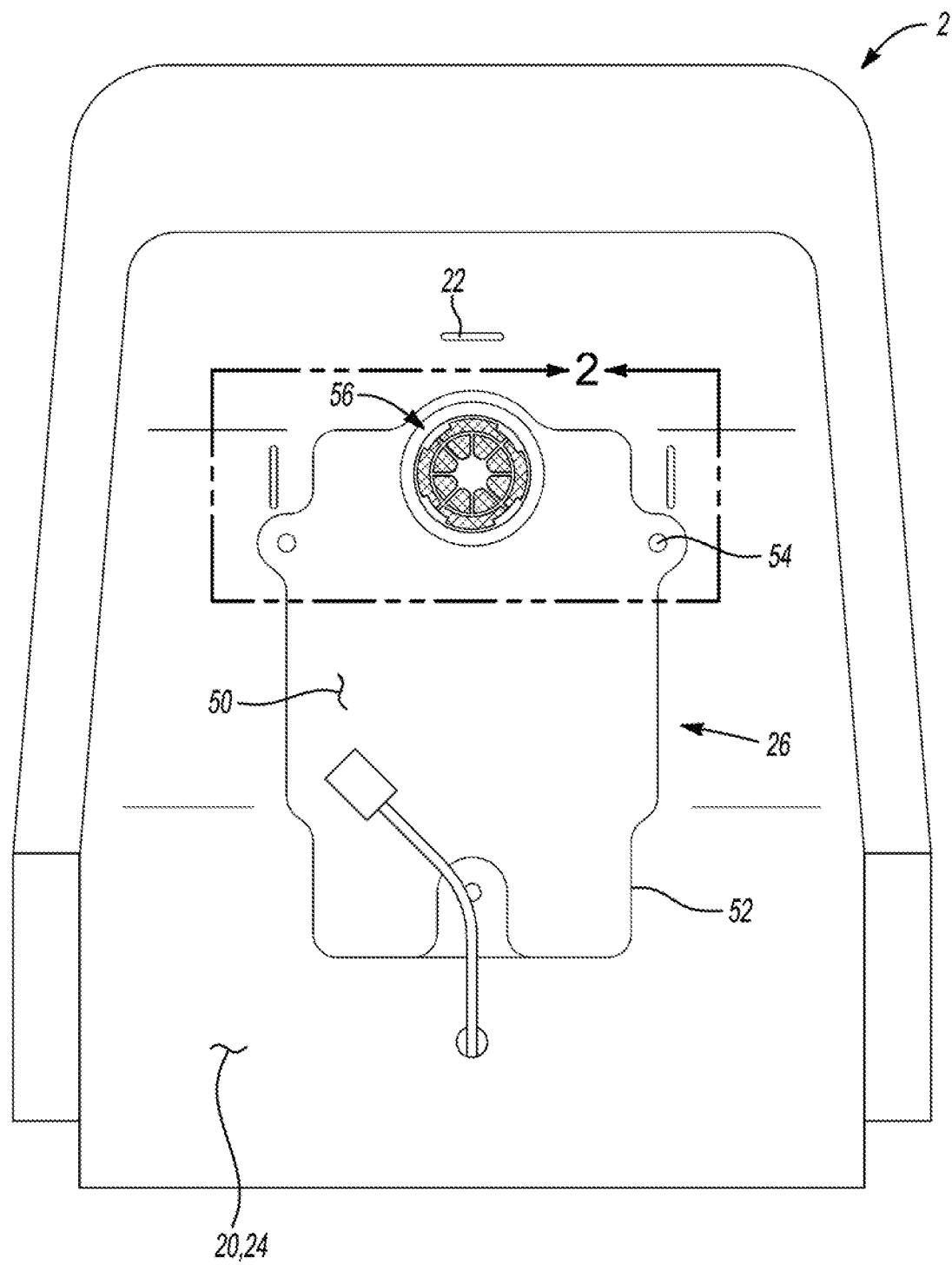
FIG. 1 is a view of a ventilated trim bag connected to a rear side (B-side) of a cushion.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings are predicated upon providing an improved conditioning system suitable for integration into a vehicle. For example, the conditioning system may be integrated into or attached to carriers (e.g., members, structures, panels, floors, walls, or the like) of various articles of manufacture such as buildings, furniture, transportation vehicles, (e.g., boats, trains, airplanes, motorcycles, all terrain vehicles, busses, snowmobiles, or otherwise) or the like. Alternatively, the conditioning system may be integrated into or attached to various components of transportation vehicles such as seats, benches, panels, footwells, floor mats, or other components. Preferably, the conditioning system is integrated into a vehicle seat. More preferably, the conditioning system is integrated on a rear side (e.g., B-side of a vehicle seat).

The conditioning system is particularly suitable for integration into a seat of an automotive vehicle. More particularly, the conditioning system is suitable for integration with the seat portion with or without bolsters, back portion with or without bolsters, head rest portion, or a combination thereof. The conditioning system may be located between two layers of the seat. The conditioning system may be located under a fabric layer (e.g. cloth, leather, synthetic leather, or the like) and under a cushion or backrest (e.g. a foam support for the user). In one aspect, the present teachings employ a structure that makes it particularly suited for use beneath a perforated leather seat cover or perforated synthetic leather seat cover. The present conditioning system is particularly attractive for use in combination with a conditioned seat (e.g. a ventilated, actively cooled (such as by use of a thermoelectric device or module), or actively heated seat). The conditioning system may be integrated with the seat cover by way of sewing, gluing, or other methods. The conditioning system may be integrated with the seat foam support by way of moulding, gluing, or other attachment methods. Preferably, the conditioning system is included underneath the cushion of the seat and the cushion assists in distributing air from the conditioning system to an occupant, predetermined locations, or both. The conditioning system may include one or more blowers and one or more inserts (i.e., ventilated trim bags); one or more heaters, one or more thermoelectric devices, or a combination thereof.

A conditioned seat may include one or more air movers (air movers and blowers are used interchangeably herein). The one or more air movers may move air through one or more inserts that are located within or overlay the backrest cushion, seat cushion, or both. Preferably, the conditioning system taught herein is connected to a back of a vehicle seat. The one or more inserts may distribute the air from the air mover. The one or more air movers may be an axial fan, a radial fan, or both. Preferably, the one or more air movers are a radial fan. The one or more air movers may include a Thermoelectric Device (TED). The TED may heat air as it enters the air mover or as it leaves the air mover. The TED may cool air as the air enters the air mover or as the air leaves the air mover. The one or more air movers may include a heating device, a cooling device, or both (i.e. a thermoelectric device (TED)). The TED may be used to heat air and/or cool air that is blown onto the user. The air mover and TED may be placed in the seat in many different configurations or in communication with a vehicle seat insert. For example, the TED and/or air mover may be used in any manner or any configuration with an insert described in any of U.S. Pat. Nos. RE38,128; 4,923,248; 6,629,724; 6,676,207; 6,857,697; 6,869,139; 6,869,140; 6,976,734; 7,083,227; 7,213,876; 7,338,117; 7,356,912; 7,475,938; 7,506,938; and 7,587,901 or U.S. Patent Application Publication No. 2009-0218855 the teachings of which are expressly incorporated by reference herein for all purposes. The TED and heater may both produce heat at the same time; however, it is contemplated that the TED or heater may be used separately. The heater may be used to produce heat in an active heating system in place of a TED. The heater, preferably, may not be used when the TED is used to cool the user. The air mover and TED may be used in conjunction with an insert disclosed herein so that air may be directed evenly and consistently to the user. The air may be blown through the insert, a heater, perforations in the seat cover (e.g. trim layer), holes or perforations in a cushion, or a combination thereof. Some examples air permeable seats and heating device are U.S. Pat. Nos. 6,064,037 and 6,869,140 both of which are incorporated by reference herein for all purposes. The TED may blow hot air while the heater contemporaneously heats the seat; thereby, providing both conduction heating and convection heating. The ventilated trim bag may include cutouts, internal slits, external slits, voids, apertures, carrier configuration, or the like may be shaped similarly or be aligned with the perforations in the seat cover.

One or more cushions of the seat may include ventilation, active cooling, active heating, or a combination thereof. The seat may include one or more air movers (i.e. blower) in fluid connection to the one or cushions so that air may be blown onto the user or so that air may be pulled away from the user. The cushion may be connected to or part of a conditioning system.

The conditioning system may be used in conjunction with an occupant sensor. An occupant sensor may be used on any seat in conjunction with a conditioning system. Preferably, an occupant senor may only be used on passenger seats. The occupant senor may be any type of occupant senor that senses a passenger in a vehicle seat. The occupant senor may be a membrane sensor, a capacitive sensor, a force sensor, a mass sensor, or a combination thereof. A microprocessor may monitor the occupant senor for a passenger. For example, the microprocessor may be attached to a occupant senor and when the occupant senor measures that the seat is free of an occupant the conditioning system may remain off even if all of the other conditions are met such as the conditioning system being turned on. The occupant sensor may be in contact with a ventilated trim bag. Preferably, the occupant sensor is located on a top of a cushion and the ventilated trim bag is located under the cushion.

The ventilated trim bag may be an insert, a bag, or both. One example of a ventilated trim bag is illustrated in U.S. Pat. No. 6,869,140, the teachings of which are expressly incorporated by reference herein for all purposes. The ventilated trim bag may include open edges. The ventilated trim bag may include one or more top layers and one or more bottom layers with one or more insert layers extending between the one or more top layers and the one or more bottom layers. The ventilated trim bag may include one or more holes in the one or more top layers, one or more bottom layers, or both. The ventilated trim bag may receive air from an air mover and distribute the air to predetermined locations. The ventilated trim bag may create an open space. The ventilated trim bag may resist crushing when an occupant sits in a vehicle seat. For example, the ventilated trim bag may not completely seal off and air may flow through an entire volume of the ventilated trim bag. The ventilated trim bag may be located on a top of a cushion or a bottom of a cushion. The ventilated trim bag may be a "B-side" trim bag. The ventilated trim bag may be part of a push system, a pull system, or a combination of both. The air may enter the ventilated trim bag through the bottom layer.

The bottom layer may function to allow air to enter into the ventilated trim bag and to direct air towards exit locations. The bottom layer may be permeable. Preferably, the bottom layer may be impermeable, include an impermeable coating, or both. The bottom layer may be a porous material. The bottom layer may be a film. The bottom layer may be made of a polymeric material. The bottom layer may be made of polyester, biaxially oriented polyethylene terephthalate, polyvinyl fluoride, polyethylene, polypropylene, nylon, polyvinyl chloride, or a combination thereof. The bottom layer and the top layer may be made of the same material. The bottom layer may be one or more layers. Preferably, the bottom layer is a single layer. The bottom layer may be separated from a top layer by an insert layer.

The insert layer may function to create an open space between the top layer and the bottom layer. The insert layer may prevent the bottom layer and the top layer from being moved into contact. The insert layer may be a mesh material. The insert layer may resist compression. The insert layer may form a space for air to move through the ventilated trim bag. One example of a preferred material of the insert layer is 3mesh® spacer material manufactured by Mueller Textile of Wiehl, Germany. The insert layer may be one or more layers of material. Preferably, the insert layer is a single layer of material that is located between the top layer and the bottom layer.

The top layer may function to distribute air flow to predetermined locations. The top layer may include one or more holes. The top layer may include a plurality of holes. The one or more holes may be aligned with holes in a cushion. The one or more holes may distribute air from the ventilated trim bag to locations that correspond with regions of an occupant (e.g., lower back or legs). The one or more holes may be an absence of material. The one or more holes may be formed by removing material. The one or more holes may be formed by cutting the top layer. The top layer and the bottom layer may be connected together around edges to form a seam. The top layer and bottom layer may be ultrasonically bonded together, melted together, glued together, heat staked, sewn, stitches, or a combination thereof.

The heater may include a protective layer. The protective layer may extend over the top layer, the bottom layer, or both the top layer and the bottom layer. The top layer, the bottom layer, or both may be made of the protective layer. The protective layer may form substantially all of the top layer or the bottom layer. For example, the protective layer may be a fleece that includes an adhesive or a polymeric film that prevents fluid from exiting through the protective layer. The protective layer may protect a film or an adhesive from stretching, breaking, being pierced, or a combination thereof. The protective layer may be made of a woven or unwoven material such as polyester, fleece, polypropylene, rayon, nylon, wool, linen, cotton, any combination thereof, or the like. The fifth layer may be breathable or non-breathable. Preferably, the protective layer is a breathable polyester. The size, shape, and configuration of the protective layer may substantially mirror the size, shape, and configuration of the cushion, holes in the cushion, or both. The protective layer may be on one or both sides of the ventilated trim bag. The protective layer may be held on the ventilated trim bag by an adhesive, a mechanical fastener, or both. The protective layer may be connected to the top layer, the bottom layer, or both to connect the protective layer to the ventilated trim bag. The protective layer may have a bulk density that is about 0.6 g/cm3 or less, about 0.4 g/cm3 or less, about 0.2 g/cm3 or less, or even about 0.10 g/cm3 or less (i.e. about 0.15 g/cm3 to about 0.04 g/cm3). The ventilated trim bag may be free of a protective layer. The protective layer may be joined together to form a portion of the seam.

The seam may function to create sealed edges so that air can only leave the ventilated trim bag through predetermined locations. The one or more seams may extend along each edge of the ventilated trim bag so that a completely sealed bag is formed. The one or more seams may extend along only longitudinal edges or lateral edges. The seams may be free of any of the insert layer. The seams may extend beyond the insert layer so that the insert layer is entirely located between the top layer and the bottom layer. Preferably, the one or more seams extend around a periphery of the ventilated trim bag so that all edges of the ventilated trim bag substantially prevent air leakage. The one or more seams, the ventilated trim bag, or both may include one or more connection holes.

The one or more connection holes may function to align a ventilated trim bag with a cushion, to connect a ventilated trim bag to a cushion, or both. The one or more connection holes may extend through any portion of the ventilated trim bag. The one or more connection holes may extend through a seam, extra material, an ear along one or more edges of the ventilated trim bag, or a combination thereof. The one or more connection holes may only be used to align the trim bag with the cushion, holes in the cushion, or both. The one or more connection holes may receive a fastener. The one or more connection holes may be free of connection and may be used for alignment by temporarily being contacted during attachment. The ventilated trim bag may be adhesively connected to the cushion. For example, a two-faced tape, liquid adhesive, adhesive film, or a combination thereof may connect the ventilated trim bag to the cushion. The blower, housing, or both may assist in connecting the ventilated trim bag to the cushion. The ventilated trim bag may include one or more attachment rings that allow air to be introduced into the ventilated trim bag without air escaping from the ventilated trim bag.

The one or more attachment rings may function to form a fixed connection with a blower or a housing of the blower. The one or more attachment rings may connect to an inlet or an outlet of a housing or a blower. The one or more attachment rings may connect to any part that makes a connection between a blower and a ventilated trim bag. The one or more attachment rings may be part of a top layer, a bottom layer, an insert layer, or a combination thereof. The one or attachment rings may be part of a top layer or a bottom layer of the ventilated trim bag and may allow the inlet or the outlet of the blower to fixedly connect to the ventilated trim bag so that air is prevented from leaking, the trim bag and the blower become one unit, the blower is at least partially suspended from the ventilated trim bag by the attachment ring, or a combination thereof. The one or more attachment rings may be integrated into a bottom layer or a top layer. The one or more attachment rings may be connected within the bottom layer or the top layer via adhesive, bonding, a mechanical faster, sewing, stitching, or a combination thereof. The one or more attachment rings may include one or more attachment recesses that receive one or more tabs of a blower, a housing, or both.

The one or more attachment recesses may function to connect a blower to the ventilated trim bag. The one or more attachment recesses may to receive one or more tabs, connect a blower to the attachment ring, connect an inlet and/or outlet of a blower to the attachment ring, or a combination thereof. The one or more attachment recesses may be rigid. The one or more attachment recesses may be flexible so that the tabs of the housing may extend threrethrough. The one or more attachment recesses may assist in preventing fluid leakage between the blower and the ventilated trim bag by retaining the blower proximate to the ventilated trim bag.

The blower functions to push air, pull air, or both. The blower may be movable with the cushion, the ventilated trim bag, or both as an occupant sits on the cushion or leaves the cushion. The blower may be an axial fan. Preferably, the blower may be a radial fan. The blower may include one or more impellers that move air through the blower, the blower housing, the ventilated trim bag, or a combination thereof. The blower includes an inlet and an outlet. The inlet may be on the bottom side or the top side. Preferably, the inlet is in the bottom side of the blower. The inlet may face a bottom of the cushion. The inlet may be located under the ventilated trim big that extends along a rear surface of the cushion (i.e., B-side). The inlet or the outlet is connected to the ventilated trim bag via the attachment ring. A gasket or bellow may extend between the blower and the ventilated trim bag. The gasket may allow the ventilated trim bag to move relative to the blower as the occupant moves. The gasket or bellow may be an elastomeric material (e.g., rubber). The inlet and outlet may allow air to move into and out of the housing.

The housing functions to connect the blower within a system, direct air to a predetermined location, or both. The housing may connect the blower to a seat, a cushion, a frame, or a combination thereof. The housing may be rigid. The housing may be flexible. The housing may include rigid regions and flexible regions. The housing may include one or more integral parts (e.g., a part that is formed with the housing) that connect the housing, the blower, or both to a cushion, a ventilated trim bag, or both. The housing may include parts that are added to the housing after the housing is formed and the parts may assist in connecting the housing, the blower, or both to the cushion, a ventilated trim bag, or both. The housing may include one or more parts (e.g., clips, eyelets, or bands).

The one or more clips function to connect to a cushion and preferably a support of a cushion. The one or more clips may be an integral part of the housing. The one or more clips and the housing may be formed at the same time so that the one or more clips and the housing are connected together. The one or more clips may be discrete from the housing. The one or more clips may be cantilever and extend from the housing. The one or more clips may be movable about a pivot point. The one or more clips may be fixed (i.e., free of movement). The one or more clips may be hook shaped, "J" shaped, or both. The one or more clips may have a channel that locks the clip to a support. The one or more clips may have an open end and a closed end. The open end may receive a support that extends into the clip and is locked within the closed end of the clip. The one or more clips may include a lock that prevents a support from being removed from the clip. The clip may be free of a lock. The clip may be retained in place by one or more tabs, one or more bands, or both. Some of the clips may be made with the housing and some of the clips may be added to the housing. Some of the clips may be connected to one or more bands that connect the clip to the housing. The one or more clips, the one or more bands, or both may be connected to the housing by one or more eyelets.

The one or more eyelets may function to connect one or more bands, one or more clips, or both to the housing. The one or more eyelets may be an integral part of the housing. The one or more eyelets may be made at the same time as the housing so that the housing and the eyelets are one piece. The eyelets may be connected to the housing via a fastener. The one or more eyelets may include an aperture that a clip, a band, or both extends through. The eyelets may connect to a band. The eyelets may allow a band to move through the eyelets. The eyelets may allow a band to extend therethrough so that the clips may be extended to connect to a support. The eyelets may be generally square shaped. The eyelets may be generally rectangular. The eyelets may have a portion located in a first plane that lies above a plane of the top of the housing so that the band can extend in the plane above the top of the housing. The housing may include two eyelets that are located on opposite edges of the housing. The eyelets may be located on a left edge, a right edge, a top edge, a bottom edge, or a combination thereof. The eyelets may be on a left edge and a right edge. The eyelets may be located on a top edge and a bottom edge. The one or more eyelets may receive one or more bands.

The one or more bands function to connect the blower to a cushion, a support, a ventilated trim bag, or a combination thereof. The conditioning system may include one or more bands, two or more bands, three or more bands, or even four or more bands. The one or more bands may be connected to the housing. The one or more bands may have an end connected to the housing. A middle region of the one or more bands may be connected to the housing. An end of each of the one or more bands may be connected to the housing. The one or more bands may be free of attachment to the housing other than a connection via the eyelets. The one or more bands may be connected to the housing by a faster, a hook, adhesive, the eyelets, or a combination thereof. The one or more bands may be elastic. The one or more bands may adjust as a shape of the cushion changes with movement of an occupant so that the blower maintains a connection with the ventilated trim bag, the blower, or both. The band may allow for movement of the blower due to or relative to a lumbar adjustment system, a massage system, or both. For example, if the lumbar region of the back rest is bowed towards the occupant the bands will permit movement of the blower towards the occupant as well. The one or more bands may be free of elasticity. The one or more bands may be adjustable. The one or more bands may be extendable through the eyelets. The one or more bands may include a clip connected to an end. Preferably, a clip is connected to each end of the one or more bands. The band extend through a side release connector. For example, the band may extend around one or more bars and through one or more openings that connect the band to the clip. The band may be folded back upon itself to form a connection with the clip. The band may be stitched to the clip. The band may be stitched to itself.

The stitching may function to connect a clip to a band. The stitching may form a fixed connection between the clip and the band. The stitching may create a movable connection. The clip may move relative to the band via the stitching. The stitching may extend from a first side to a second side of the clip, the band, or both. The stitching may connect the clip to the band, the housing, or both. The clips and/or one or more bands may assist in connecting the blower to the ventilated trim bag via an attachment ring and tabs so that an inlet or an outlet of the blower aligns with an inlet or outlet of the ventilated trim bag.

The one or more tabs function to connect the blower to the ventilated trim bag, the attachment ring, or both. The one or more tabs may extend outward from the blower. The one or more tabs may extend cantilever from the housing. The one or more tabs may be an integral part of the housing (e.g., the tabs and housing may be made at the same time and be a same piece). The one or more tabs may be located proximate to an inlet, an outlet, or both. The one or more tabs may be triangular in shape. The one or more tabs may be shaped like the number 4. The one or more tabs may be flexible so that the tabs may be extended into attachment recesses in the attachment ring. The one or more tabs may be biased by contact with the attachment recess. The one or more tabs may be a one way fastener. For example, the tabs may include an angled portion that assists in entering the attachment recess and prevent the tabs from being removed from the attachment recess. The tabs may be equally spaced apart about an inlet or an outlet of the blower. Housing may include one or more tabs, two or more tabs, three or more tabs, four or more tabs, or even five or more tabs. The tabs may connect the blower to the ventilated trim bag and the clips may assist in connecting both the ventilated trim bag and the blower to the cushion.

The one or more cushions may function to support an occupant, a conditioning system, or both. The one or more cushions may extend over a bottom or a back of a frame to form a portion of a vehicle seat. The one or more cushions may be made of an open cell foam, a closed cell foam, or both. The one or more cushions may be located between a trim layer and a frame. The one or more cushions may be located between an occupant and a conditioning system, a ventilated trim bag, a blower, or a combination thereof. The cushion may include one or more supports that assist in connecting a ventilated trim bag, a blower, or both to the cushion.

The one or more supports may function to create an anchor for one or more blowers, one or more ventilated trim bags, or both. The one or more supports may be formed into the cushion. The one or more supports may be installed in the cushion while the cushion is being formed. The one or more supports may be installed in the cushion after the cushion is created. The one or more supports may extend out from a surface of a cushion. The one or more supports may extend from a top side, a bottom side, or both of a cushion. Preferably, a plurality of supports extend from a bottom side of the cushion. The plurality of supports may be made of a rigid material. The plurality of supports may be made of metal, a hard plastic, or both. The supports may be wire, a rod, or both. The plurality of supports may be "U" shaped, "C" shaped, "L" shaped, or a combination thereof. The plurality of supports may be shaped to receive a clip. The clip may include two or more legs that extend from the cushion. The support may include a connection portion that extends between the two or more legs. The plurality of supports may have a portion that extends parallel (e.g., connection portion) to a surface of the cushion. The clip may connect to the portion (i.e., connection portion) that extends parallel to the surface of the cushion. The supports may be movable with the cushion. The supports may resist being pulled out of the cushion. The supports may have anchors that prevent the supports from being pulled out of the cushion. The anchors may be an increase in cross-sectional thickness of the support, a plate that connects two or more legs of the support, or both. The anchors may be molded into the cushion. The supports may each receive one clip and the supports may assist in attaching a blower to the ventilated trim bag, the cushion, or both. Preferably, the supports are located on the rear side of the cushion (e.g., B-side) so that both the ventilated trim bag and the blower are connected to the rear of the cushion. The ventilated trim bag may be connected to the rear side of the cushion by both the supports and an adhesive.

The adhesive may function to connect all or a portion of a ventilated trim bag to a cushion. The adhesive may be a liquid adhesive. The adhesive may be a dry adhesive. The adhesive may be a peel and stick layer. The blower, cushion, and ventilated trim bag may be attached together via a process.

The process may include one or more of the following steps. The ventilated trim bag may be attached to the cushion. Adhesive may be applied to the ventilated trim bag, the cushion, or both. A peel and stick film maybe applied to the ventilated trim bag, the cushion, or both. A release layer may be removed from the peel and stick film. Pressure may be applied to the ventilated trim bag, the cushion, or both after the adhesive or peel and stick layer is applied. The inlet or outlet of the blower may be aligned with the attachment ring of the ventilated trim bag. One or more tabs may be extended into one or more attachment recesses in the ventilated trim bag. A clip of the housing may be connected to a support in the cushion. A clip that is formed with the housing may be attached to a support in the cushion. The blower may be rotated about the connection between the clip and the support in the cushion. A clip may be moved about a band. The band and clip may be moved proximate to a support on a first side of the blower. The clip may be attached to a support on a first side of the blower. A clip and band may be moved proximate to a support on a second side of the blower. The clip may be attached to a support on a second side of the blower. The band may be tightened. The blower may be attached to one or more supports via one or more clips and then the tabs may be connected to the one or more attachment recesses. The ventilated trim bag, blower, or both may be connected to a bottom side (B-side) of the cushion. One or more connection holes of the ventilated trim bag may be aligned with one or more features of the cushion. One or more holes in the ventilated trim bag may be aligned with one or more holes in the cushion. The band may be extended through one or more eyelets in the housing. The band may be stitched. The clips may be connected to the band. The clips may be stitched onto the band.

FIG. 1 illustrates a ventilated trim bag 50 of a conditioning system 2 connected to a rear 24 of a cushion 20 by adhesive 26 that extends between the ventilated trim bag 50 and the cushion 20. The cushion 20 includes a plurality of supports 22 that are partially located within the cushion 20 and partially extend out of the cushion 20. The ventilated trim bag 50 includes an attachment ring 56 that connects to a blower (not shown). The ventilated trim bag 50 also includes connection holes 54 that may be used to mechanically connect the ventilated trim bag 50 to the cushion, to align the ventilated trim bag 50 on the cushion 20, or both. A seam 52 extends around the ventilated trim bag 50.

Figure 2:
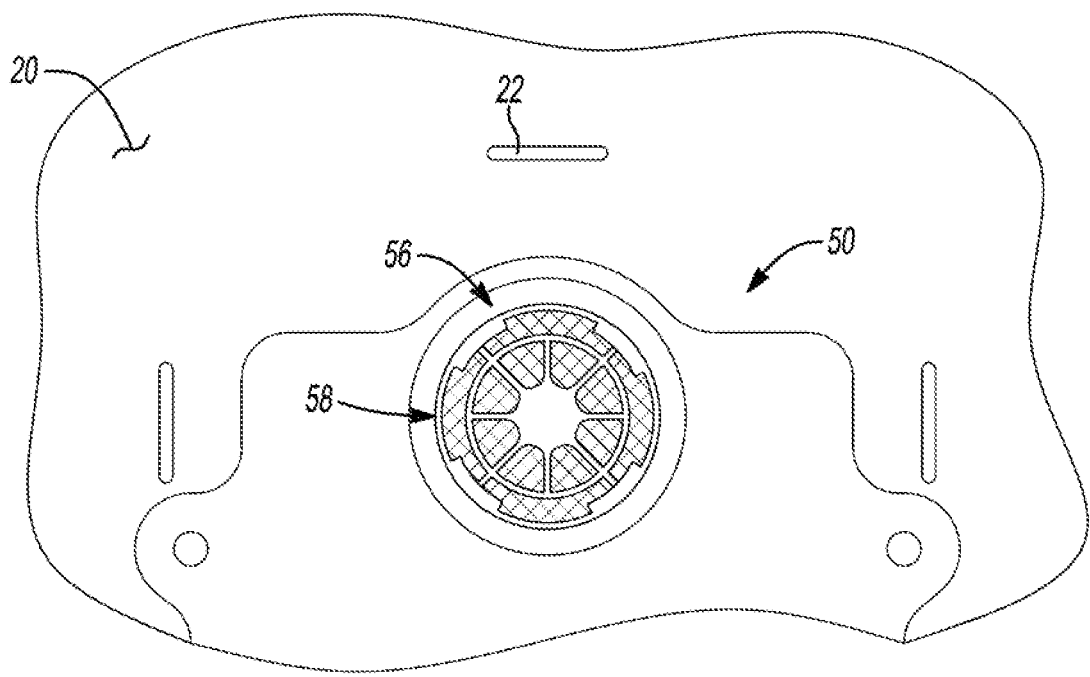
FIG. 2 illustrates a close-up view of the support ring of the ventilated trim bag and the wire supports of the cushion of FIG. 1.

FIG. 2 is a close-up view of the support 22 in the cushion 20 and the attachment ring 56 in the ventilated trim bag 50. The attachment ring 56 includes a plurality of attachment recesses 58 that assist in connecting to a blower.

Figure 3:
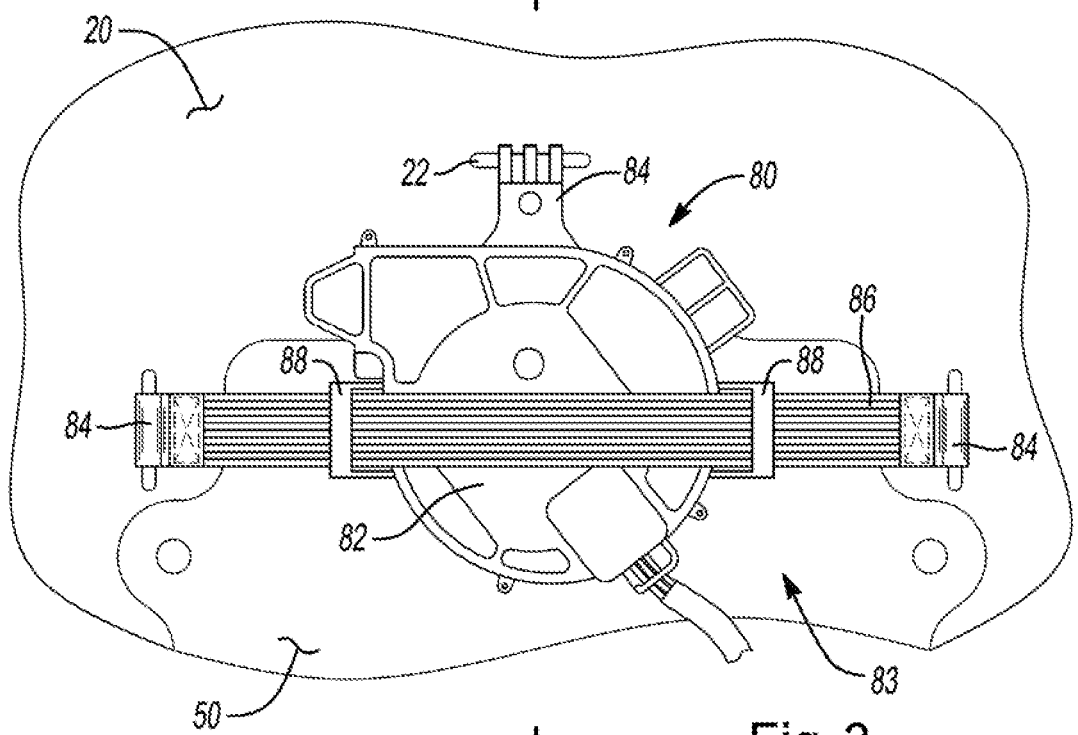
FIG. 3 illustrates a blower connected to the ventilated trim bag by connecting to the metal supports.

FIG. 3 illustrates the blower 80 connected to the ventilated trim bag 50 and the cushion 20. The blower 80 includes a housing 82 with an integral blower attachment mechanism 83. The blower attachment mechanism 83 includes a pair of opposing eyelets 88 that receive and connect the blower 80 to a band 86. Each end of the band 86 includes clips 84 that connect to the supports 22 of the cushion 20. The housing 82 of the blower 80 includes a clip 84 that connects to a support 22.

Figure 4:
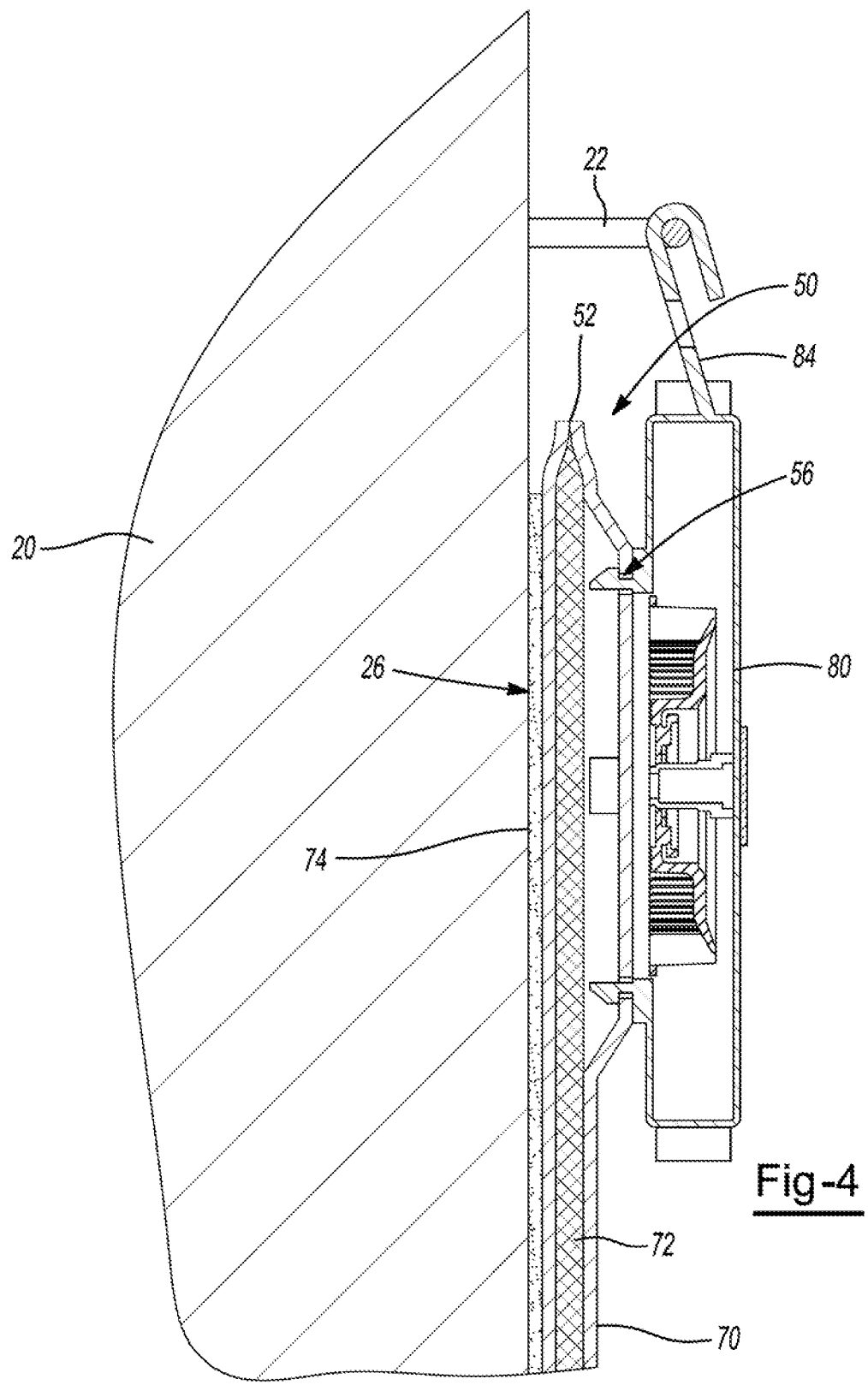
FIG. 4 is a cross-sectional view of FIG. 3 cut along line 4-4.

FIG. 4 is a cross-sectional view of FIG. 3 cut along line 4-4. A ventilated trim bag 50 is located on and connect to a cushion 20 by adhesive 26. The cushion 20 also includes supports 22 that connect to a clip of the blower 80. The ventilated trim bag 50 includes a bottom layer 74, an insert layer 72, and a top layer 70. The top layer 70 includes an attachment ring 56 that provides an opening to the open space formed by the insert layer 72. The top layer 70 and the bottom layer 74 are connected together forming a seam 52.

Figure 5:
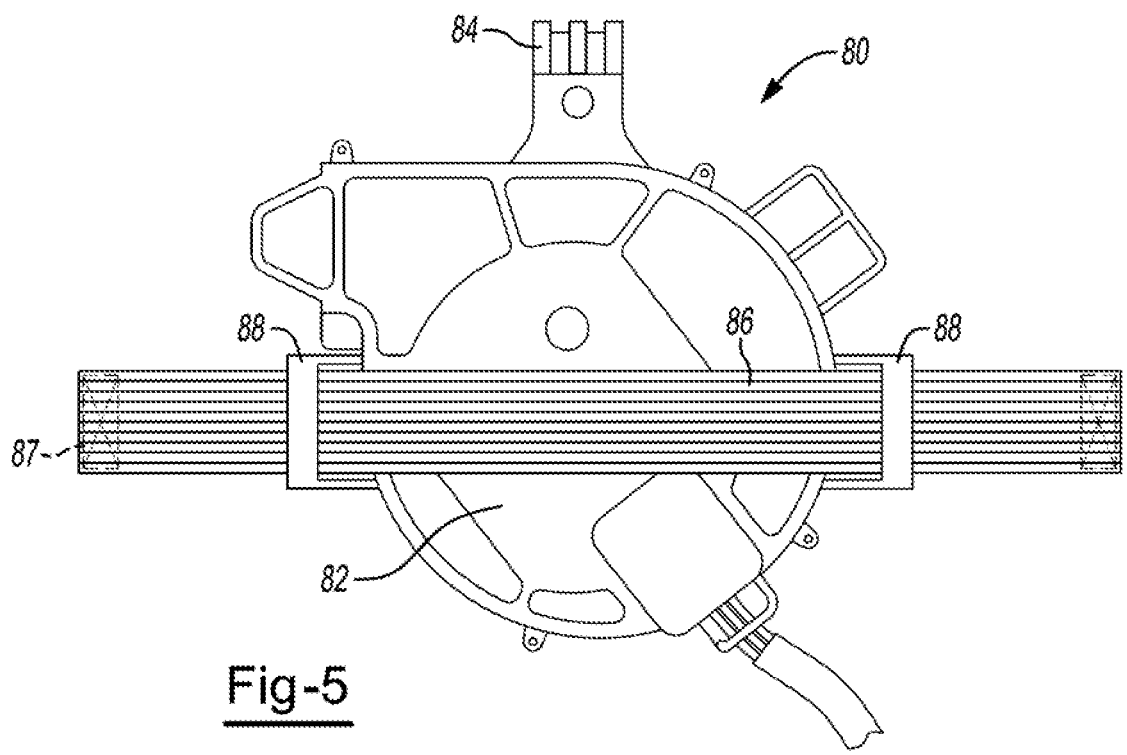
FIG. 5 illustrate a top view of a blower.

FIG. 5 illustrates a top side of a blower 80. The blower 80 includes a housing 82 including a pair of eyelets 88 that receive a band 86 with clip 84. The clip 84 is connected to the band 86 by stitching 87. The housing 82 also includes a top clip 84.

Figure 6:
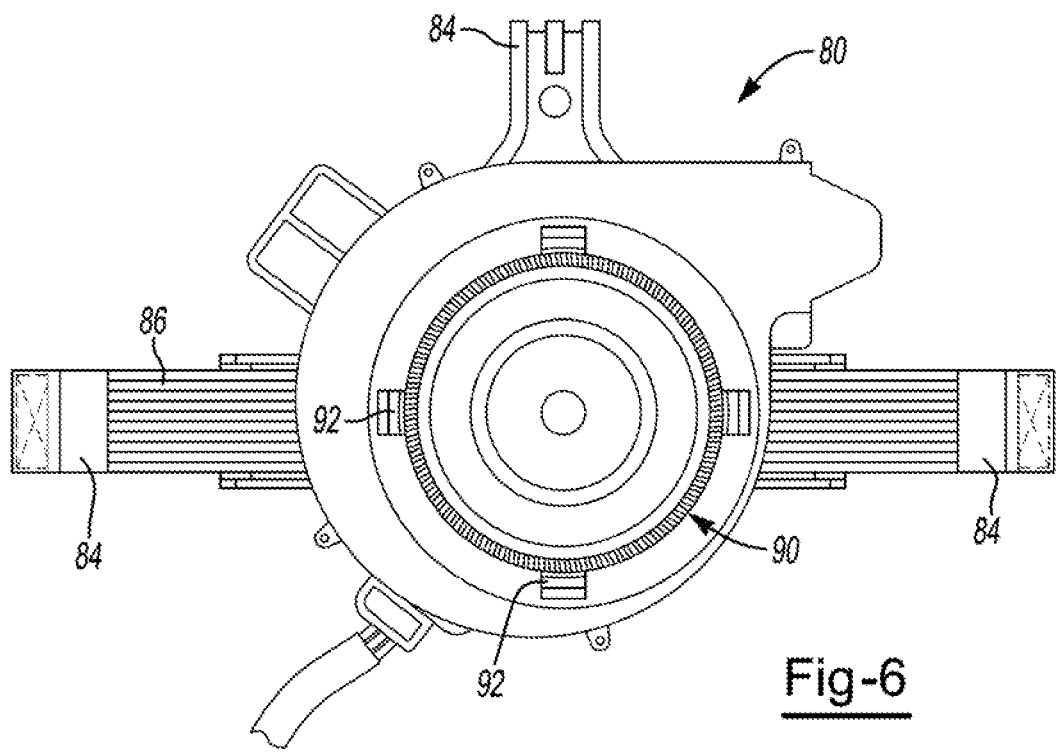
FIG. 6 illustrates a view of a bottom side of a blower.

FIG. 6 illustrates a view of an inlet 90 of a blower 80. The inlet 90 includes a plurality of tabs 92 that connect to an attachment ring of a ventilated trim bag (not shown). A band 86 with clips 84 are connected to the blower 80 via eyelets 88, and an integral clip 84 extends from a top of the blower 80.

Figure 7:
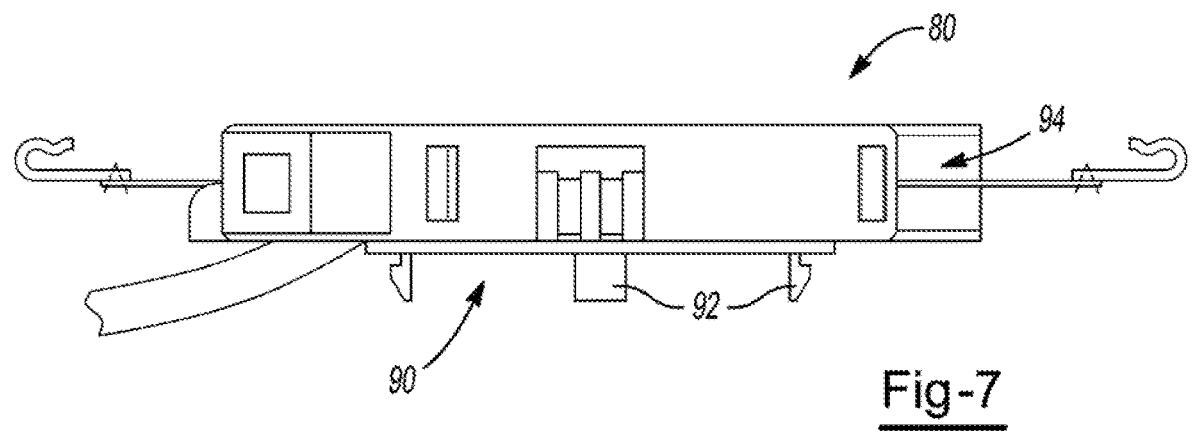
FIG. 7 illustrates a plan view of a clip that is integral to the housing of the blower.

FIG. 7 illustrates a plan view of a top edge of the blower 80. The inlet 90, outlet 94, and tabs 92 are shown.

Figure 8:
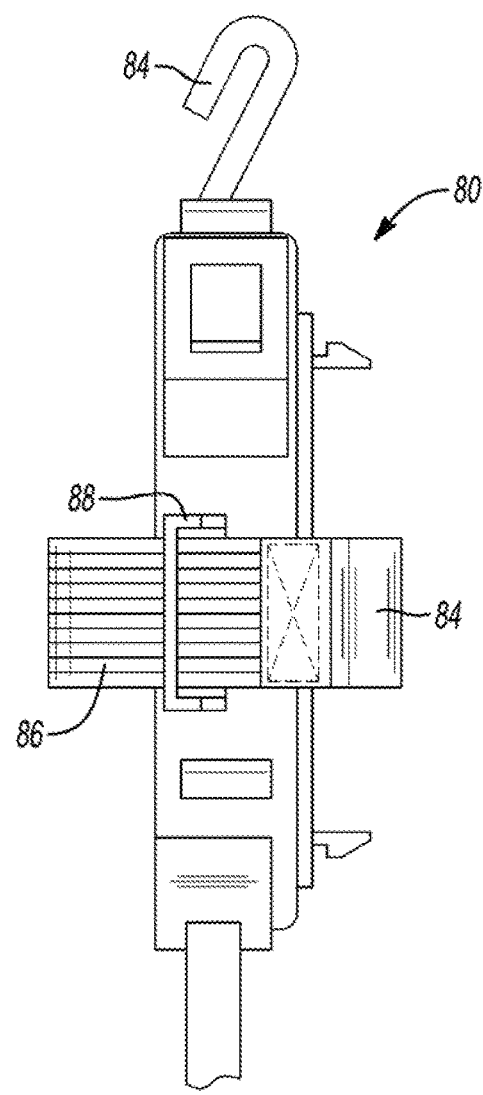
FIG. 8 illustrates a side view of the clip of FIG. 7.

FIG. 8 illustrates a plan view of a side edge of the blower 80. The clip 84 on the top edge is shown so that the hook shape is illustrated. The eyelet 88 connects a band 86 extending therethrough with a clip 84 on an end of the band.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or consist of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teaching should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

2 Conditioning System
20 Cushion
22 Support
24 rear
26 adhesive
50 Ventilated trim bag
52 Seam
54 Connection holes
56 Attachment ring
58 Attachment recess
70 Top layer
72 Insert layer
74 Bottom layer
80 Blower
82 housing
84 Clip
86 Band
87 stitching
88 Eyelet
90 Inlet
92 tabs
94 Outlet

We claim:

1. A blower comprising:
 a. a housing including:
  i. two eyelets;
  ii. an inlet; and
  iii. a housing clip;
 b. a band extending through the two eyelets, the band comprising a first end and an opposing second end, the first end comprising a first band clip and the second end comprising a second band clip;
 wherein the first band clip is configured to connect to a first support in a cushion of a seat, the second band clip is configured to connect to a second support in the cushion of the seat, and the housing clip is configured to connect to a third support in the cushion of the seat.

2. The blower of claim 1, wherein the first band clip is connected to the band via stitching in the band.

3. The blower of claim 1, wherein the housing clip is molded into the housing.

4. A conditioning system including the blower of claim 1 and the cushion.

5. The conditioning system of claim 4, wherein the conditioning system includes a ventilated trim bag, the ventilated trim bag is adjacent a bottom side of the cushion, the blower is connected to the ventilated trim bag, the blower is free of direct attachment to a frame of the seat.

6. The conditioning system of claim 5, wherein the ventilated trim bag comprises an attachment ring, and the blower comprises one or more tabs that are configured to engage the attachment ring.

7. The conditioning system of claim 6, wherein the one or more tabs extend through the attachment ring and into the ventilated trim bag.

8. A method comprising:
 a. extending the blower of claim 1 over a ventilated trim bag;
 b. placing the inlet of the blower in fluid communication with an attachment ring of the ventilated trim bag;
 c. attaching the first band clip to the first support of the cushion.

9. The method of claim 8, wherein the blower comprises one or more tabs, the method comprises: connecting the one or more tabs of the blower to the attachment ring of the ventilated trim bag.

10. The blower of claim 1, wherein the housing clip is hook shaped.

11. The blower of claim 1, wherein each of the two eyelets extend from opposing edges of the housing and the housing clip extends from a top edge of the housing.

12. The blower of claim 11, wherein the two eyelets and the housing clip are molded into the housing.

13. The blower of claim 1, wherein the blower is free of direct attachment to a frame of the seat.

14. The blower of claim 1, wherein the band extends across a backside of the housing, the housing is between the band and the cushion.

15. The conditioning system of claim 5, wherein the band extends across a backside of the housing, the housing is sandwiched between the band and the ventilated trim bag.

16. The conditioning system of claim 6, wherein an adhesive is provided between the ventilated trim bag and the cushion.

17. The conditioning system of claim 15, wherein an adhesive is provided between the ventilated trim bag and the cushion.

18. The conditioning system of claim 4, wherein the strap and the housing clip are free of direct attachment to a frame of the seat that supports the cushion.

19. The conditioning system of claim 18, wherein the first support, the second support, and the third support are arranged as a triangle on the cushion.

20. The conditioning system of claim 4, wherein the first support and the second support are located on opposite sides of the housing.

* * * * *